W. M. FULTON.
AUTOMATIC TANK REGULATOR.
APPLICATION FILED MAR. 13, 1911.
1,102,035.
Patented June 30, 1914.
2 SHEETS—SHEET 1.
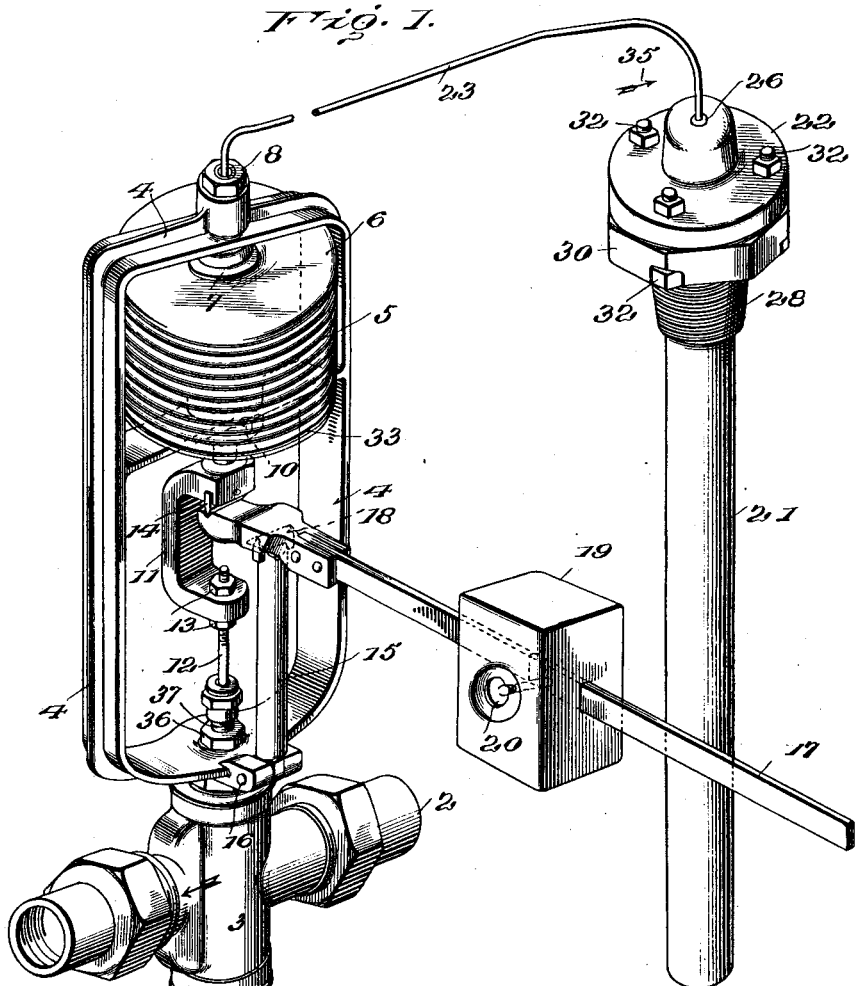
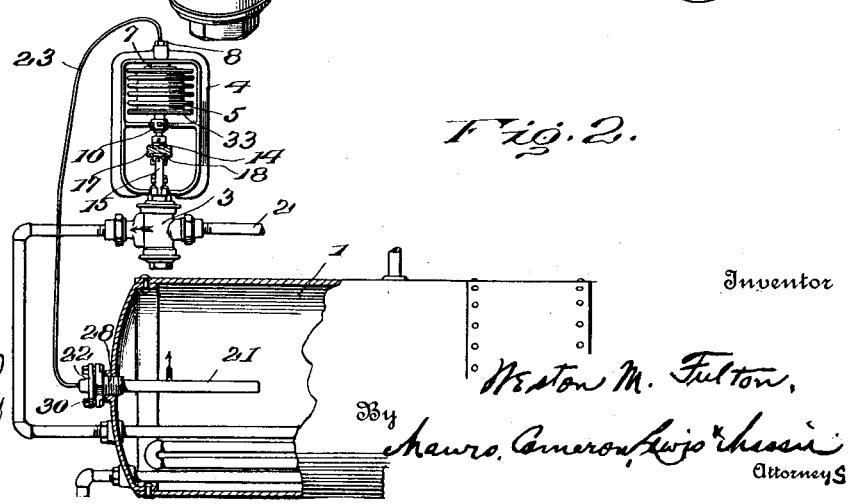

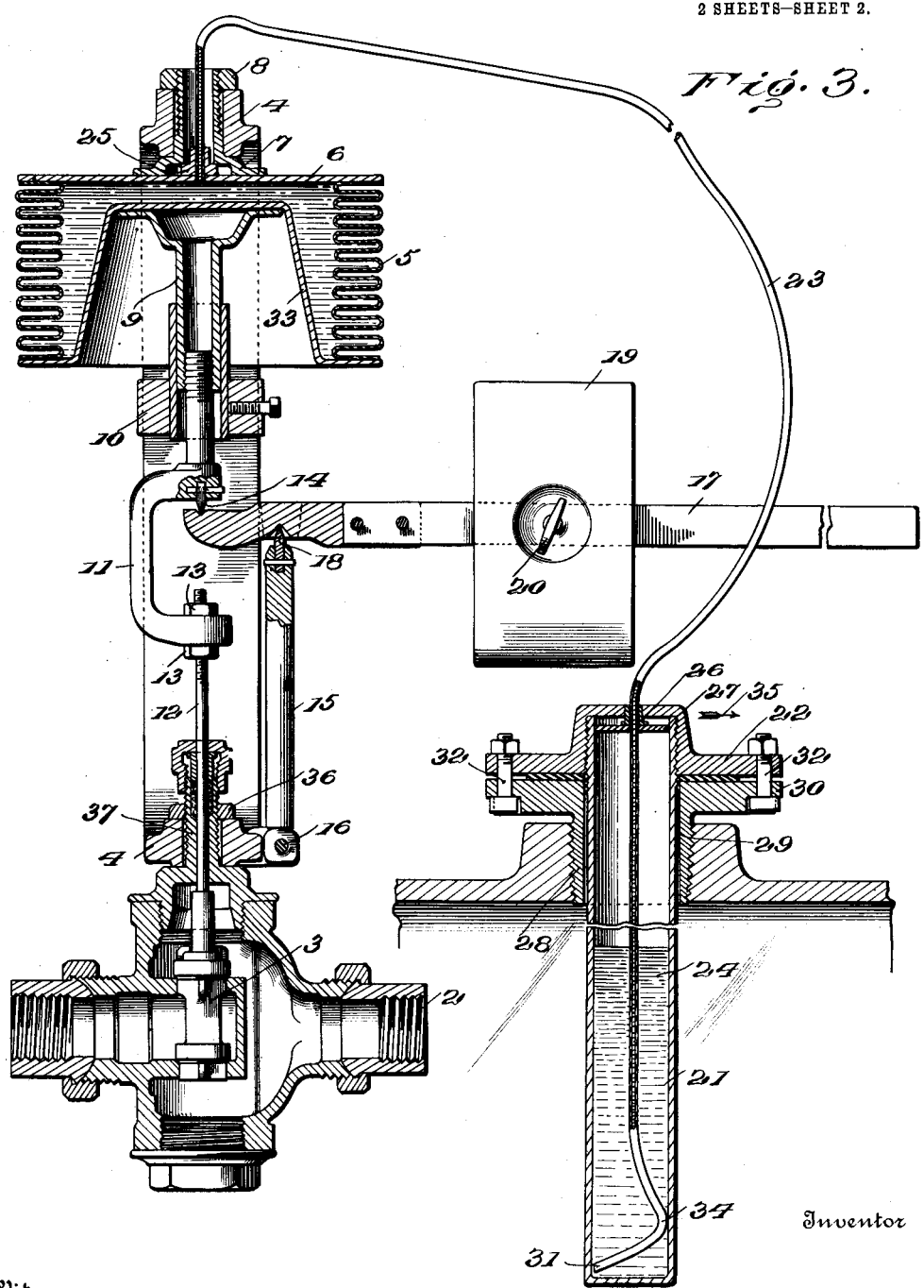

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

AUTOMATIC TANK-REGULATOR.

1,102,035.     Specification of Letters Patent.     Patented June 30, 1914.

Application filed March 13, 1911.  Serial No. 614,059.

*To all whom it may concern:*

Be it known that I, WESTON M. FULTON, of Knoxville, Tennessee, have invented a new and useful Improvement in Automatic Tank-Regulators, which invention is fully set forth in the following specification.

This invention relates to automatic temperature regulators for controlling the temperature of water and other fluids, heated by steam coils, where the steam is controlled by an inlet valve, and it has for its object the production of a simple and reliable regulator, which is not liable to get out of order, and which will operate sensitively to control the temperature within very narrow limits. In regulators of this kind, it has hitherto been the general practice to employ some form of thermostatic device inserted into the fluid whose temperature is to be controlled, and this thermostatic device would operate a small pilot valve, controlling the admission of compressed air or water to a diaphragm valve, and this diaphragm valve in turn controlled the supply of steam to the heating coil. Devices of this class are not only very expensive to manufacture, but also are so very complicated that they are frequently out of order. The thermostat usually consists of a rod or strip of metal, whose very minute expansion and contraction in length due to small changes in temperature, furnish such feeble power as to make its operation on the pilot valve very uncertain and unreliable. The numerous valves, including those on the compressed air line, also furnish additional trouble. The compressed air or water power required to actuate the diaphragm valve is also a constant source of expense when these regulators are in use. The present invention obviates all of these difficulties by eliminating all the auxiliary parts usually employed in tank regulators, and providing a direct action between the thermostatic member and the valve controlling the steam supply. For this purpose, I introduce into the tank of fluid to be heated a thermosensitive bulb or chamber that is partly filled with a volatile fluid, such as chloroform, for example. I attach to the stem of the valve controlling the supply of steam to the heating coil an expansible and collapsible vessel filled with a liquid, and I connect the bulb or receptacle containing the volatile liquid in the tank with the said expansible and collapsible vessel, by means of a conduit so arranged that the vapor in said bulb, resultant from the temperature of the water in the tank, will act to force liquid through the connecting conduit into the expansible and collapsible vessel, while at the same time the vapor itself is prevented from passing from the bulb to the last-named vessel. The said expansible and collapsible vessel is connected to the stem of the steam valve in such way that the movement of the vessel in collapsing and expanding will act to open and close the steam valve, the closing movement due to the expansion of said vessel being against some suitable resistance whose force can be adjusted, as for example, a lever having an adjustable weight mounted thereon. By insuring that, instead of an interchange of the vapor between the thermostatic bulb and the expansible and collapsible vessel, there shall be an interchange of liquid only, the sensitiveness and quick action of the device is greatly increased, for the reason that the expansible and collapsible vessel (whose movements actuate the steam valve) and the thermostatic bulb containing the volatile fluid, being exposed to different temperatures, if vapor were employed to transmit the pressure from the bulb to the expansible and collapsible vessel, the difference in temperature between the two vessels would render the whole device exceedingly sluggish; on the other hand, by reason of the construction which retains the vapor always within the bulb, and utilizes the column of liquid for transmitting the pressure of the vapor from the bulb to the expansible and collapsible vessel, the difficulties incident to the difference in temperature between the two vessels are overcome, and a quick response to changes in temperature by the regulator is obtained.

The inventive idea involved may be embodied in a variety of mechanical structures, one of which, for the purpose of illustrating the invention, is shown in the accompanying drawings, in which—

Figure 1 is a perspective view of my regulating device; Fig. 2 is a side elevation, showing the same applied in position in connection with a hot water tank and the steam pipe leading to the coil for heating the same; and Fig. 3 is a vertical section, parts being shown in elevation.

Referring to the drawings, in which like reference numerals indicate like parts, 1 is the tank containing water or other liquid to be heated, 2 the steam pipe leading to the coils in said tank, and 3 is the inlet valve for the steam to the heating coil. Mounted on the casing of the valve 3 is a suitable frame 4, and mounted in this frame is an expansible and collapsible vessel 5, which has secured to its rigid upper wall 6 a screw-threaded hub 7, leading upward through an opening in the frame 4, and having a nut 8 on the upper end, by means of which it is firmly secured in position. A flanged plunger 9 is secured to the under wall of the expansible and collapsible vessel 5, and passes downward through a guide 10, forming a part of the frame 4, which guide merely serves to insure a true rectilinear movement of the plunger 9. Secured to plunger 9 is a piece 11, which serves to connect said plunger with the valve stem 12, by means of jam nuts 13, 13. A steel knife edge bearing 14 is suitably secured to the part 11, and a similar bearing 18 is secured to an oscillating support 15 mounted at 16 on the frame 4. A lever bar 17 has bearing upon the steel knife edge 18 on the top of said oscillating support and also on the steel knife edge 14 of the part 11, said lever bar being provided with suitable bearing notches or surfaces for the knife edges 14 and 18, as shown in the drawings. Mounted upon the lever bar 17 is a weight 19 adjustable thereon, and provided with a thumb-screw 20, for fixing it in any adjusted position.

21 is a hermetically sealed bulb or vaporizing chamber screwed fast into a flange 22, and is connected with the hermetically sealed expansible and collapsible motor vessel 5, by means of a small flexible pipe 23. The bulb 21 is partly filled with a volatile fluid 24, such as chloroform, and the vessel 5 is entirely filled with the same fluid. A small flanged union piece 25 is soldered to the wall 6 of the vessel 5, in order to protect and strengthen the connection of the tube 23 with the wall 6. A similar flanged union piece 26 is used to strengthen the connection of tube 23 into the bulb 21, where the tube 23 enters the wall 27 of said bulb. For the purpose of readily connecting the regulator device to the hot water tank, I provide a screw-threaded hub 28 having an opening 29 therethrough for the passage of the bulb 21, and a flange 30 having bolt openings therethrough registering with corresponding bolt openings in the flange 22, to which latter flange the bulb 21 is secured.

In installing the device, the wall of the tank is tapped, and the screw-threaded hub or bushing 28 is inserted therein while separated from the flange 22 and the bulb 21. The bulb 21 is then inserted through the opening in the bushing 28, and turned so that the open end 31 of the pipe 23 is directed to the lower side of the bulb 21, the bulb being in horizontal position, as shown in Fig. 2. While in this position, the flange 22 and the flanged hub or boss 28 are connected together by bolts 32. For convenience in installing the bulb, and in order to insure that the open end 31 of the pipe 23 will always be directed toward the lower side of the bulb, any suitable indicating device, as an arrow 35, may be placed upon the flange 22.

It will be seen that when the liquid in the bulb 21 is heated by the rise in temperature of the water in the tank, the vapor that has formed in the bulb above the liquid 24 will have its tension increased, and will therefore act to force the liquid through the pipe 23 into the expansible and collapsible vessel 5, thereby expanding said vessel, and forcing the lower wall 33 of said vessel downward, thus closing, or tending to close, the valve 3. On the other hand, when the temperature of the water in the tank falls, the tension of the vapor in the bulb 21 above the liquid 24 in said bulb will be decreased, and the vessel 5 will be collapsed by the pressure of the weight 19 transmitted through the lever 17, thus forcing the liquid out of said vessel 5 through pipe 23 into the bulb 21.

One of the most important features in the construction of this regulator is the special trapping means which are provided for preventing vapor from passing from the bulb 21 into the vessel 5, and for insuring that, instead of an interchange of vapor between the bulb and the vessel, there is an interchange of liquid only. If the regulator were arranged to permit an interchange of vapor, instead of fluid only, its action would be exceedingly sluggish, for the reason that the vessel 5 and the bulb 21, being exposed to different temperatures (vessel 5 generally being much the colder), there would be a condensation of vapor in the colder of the two chambers, and this would prevent a quick response of the regulator to changes in temperature.

The special means herein referred to for insuring an interchange of liquid between the bulb 21 and the vessel 5 consists in having the tube 23 bent as indicated at 34, so that its open end 31 shall always be beneath the surface of the liquid in the bulb, regardless of whether the bulb 21 is placed in a vertical or a horizontal position; and in also providing such indicating means as the arrow 35 for showing when the end 31 of the tube 23 is in proper position, with its open end beneath the surface of the liquid. Moreover, by having the tube 23 enter the top or fixed wall of the vessel 5, and attaching the valve stem to the lower or movable wall of said vessel, I provide perfect freedom of movement for the valve stem, and avoid any movement of the parts at the point where the attachment of the pipe 23 to the expansible and collapsible vessel occurs, and thereby avoid any danger of rupture of the pipe or its connections to the expansible and collapsible vessel. Furthermore, by using the flanged bushing 28 for connecting the bulb 21 with the tank 2, and then bolting the flange carrying the bulb to the flange of said bushing 28, I obviate the necessity of rotating the bulb or screwing it into the tank, as is the usual practice with other regulators, and I thereby avoid the danger of twisting the pipe 23, with the consequent danger of injuring the pipe or its connections with the bulb.

By use of the connection piece 11 between the expansible and collapsible vessel and the valve stem, I am enabled to adjust the parts by means of the jam-nuts 13 and the screw-threaded valve stem connecting the latter to the part 11.

For the purpose of disconnecting the upper works of the regulator from the valve 3, I have provided a jam-nut 36, screw-threaded onto the stem 37, projecting upward from the casing of the valve 3. By loosening this jam-nut 36, the upper works of the regulator may be lifted off of the casing of the valve, since the loosening of said jam-nut permits the frame 4 to be entirely freed from the valve and its casing.

What is claimed is:—

1. In combination, a hot water tank provided with a valve controlled heat supply conduit, a thermosensitive bulb for containing a volatile liquid and located in said tank, a vibratory vessel filled with liquid, a conduit opening into said vessel and having a trap connection with said bulb, said vessel normally tending to discharge liquid into said conduit and bulb against vapor pressure in said bulb thereby maintaining said conduit filled with liquid, and connections between said vessel and valve for operating the latter.

2. In a device of the character described, the combination of a thermosensitive bulb partly filled with a volatile liquid and subject to a heating fluid the flow of which is to be regulated, said bulb being provided with a delivery tube the inner end of which opens near the side wall of the bulb and below the surface of said liquid, a closure for said bulb and means for securing the latter in the wall of said chamber, and a collapsible and expansible vessel filled with a liquid and having one end stationary and connected to said tube and the other end movable and associated with valve means controlling supply of said heating fluid.

3. In a device of the character described, the combination of a thermosensitive bulb partly filled with a volatile liquid and subject to a heating fluid the flow of which is to be regulated, said bulb being provided with a delivery tube the inner end of which is bent and opens near the side wall of the bulb and below the surface of said liquid, a closure for said bulb adapted to support the delivery tube and to be clamped to the wall of the heating chamber and a valve operating expansible and collapsible vessel filled with liquid and connected to said bulb by said tube and controlling by its movements the supply of heating fluid.

4. A thermosensitive bulb provided with a trap and adapted to be secured in the wall of a tank in a predetermined position, comprising a receptacle for containing a fluid, an end closure for the same having an opening for receiving a tube and provided with a flange, a threaded bushing adapted to be screwed in the wall of the tank and having a flange to which the flange of said closure is adapted to be secured by bolts in a predetermined position.

5. A thermosensitive bulb provided with a trap and adapted to be secured in the wall of a tank in a predetermined position, comprising a fluid receptacle and an end closure for the same having an opening for receiving a tube and provided with a flange and means for securing the flange to the wall of the boiler in said predetermined position without removing the closure from the receptacle.

6. A thermosensitive bulb adapted to be secured in the wall of a tank, comprising a fluid receptacle having an end closure provided with a flange and means for securing the flange to the wall of the boiler, said closure also having an opening, a pipe in said opening the inner end of which opens at the lowest part of said vessel to which liquid gravitates and a mark on said end closure to indicate the discharge position of said pipe opening.

7. In combination, a collapsible and extensible vessel adapted to be operated by liquid entering and leaving the same, a thermosensitive bulb adapted to supply liquid to operate said vessel, a pipe connection between said bulb and vessel through which said liquid is conducted, said pipe having an opening at the lowest part of said bulb to which liquid gravitates, and means exterior to the bulb for indicating the discharge position of said pipe to insure interchange of liquid only between said bulb and vessel.

In testimony whereof I have signed this specification in the presence of two subscribing witnesses.

WESTON M. FULTON.

Witnesses:
ANN G. JONES,
MARY L. JONES.